UNITED STATES PATENT OFFICE.

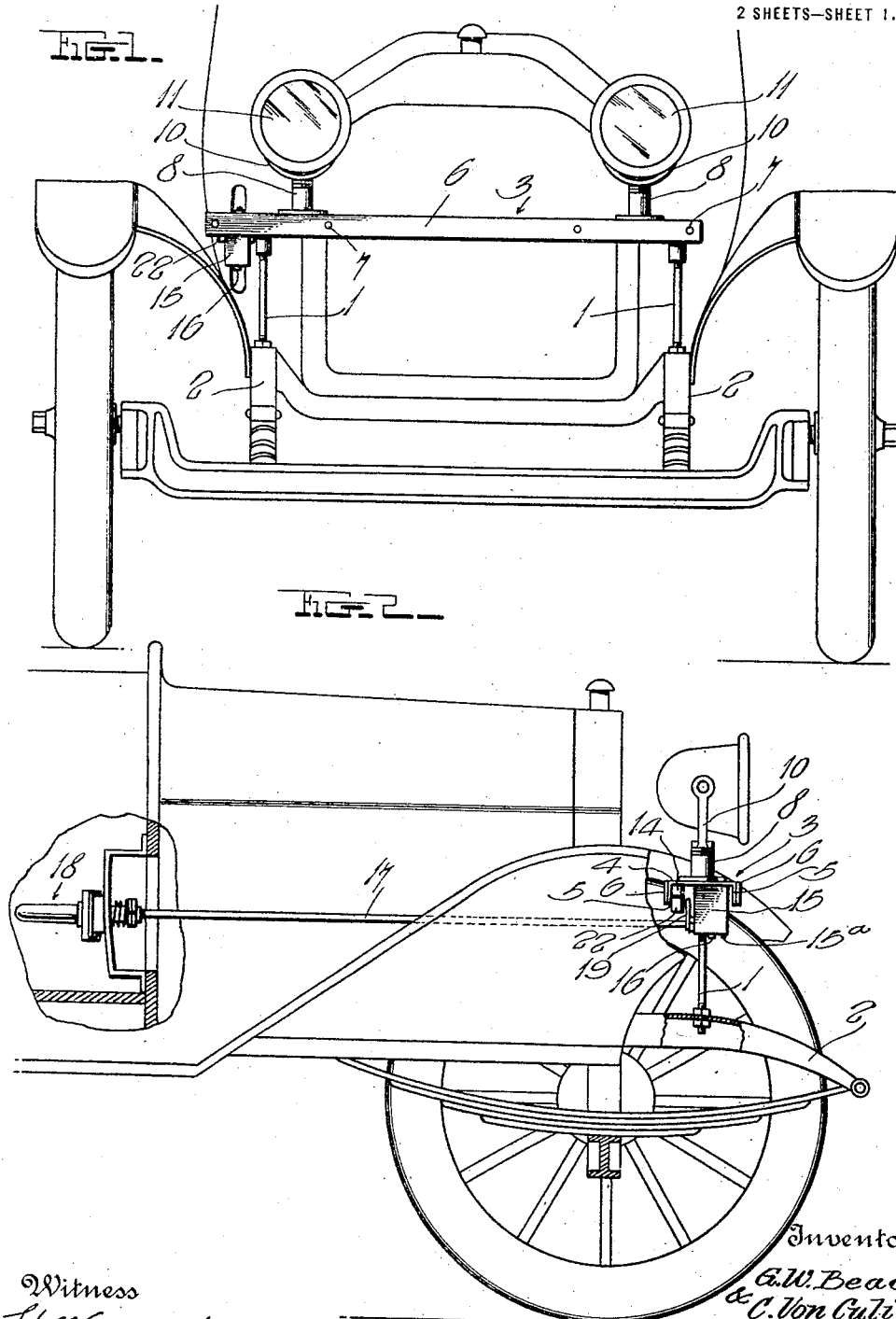

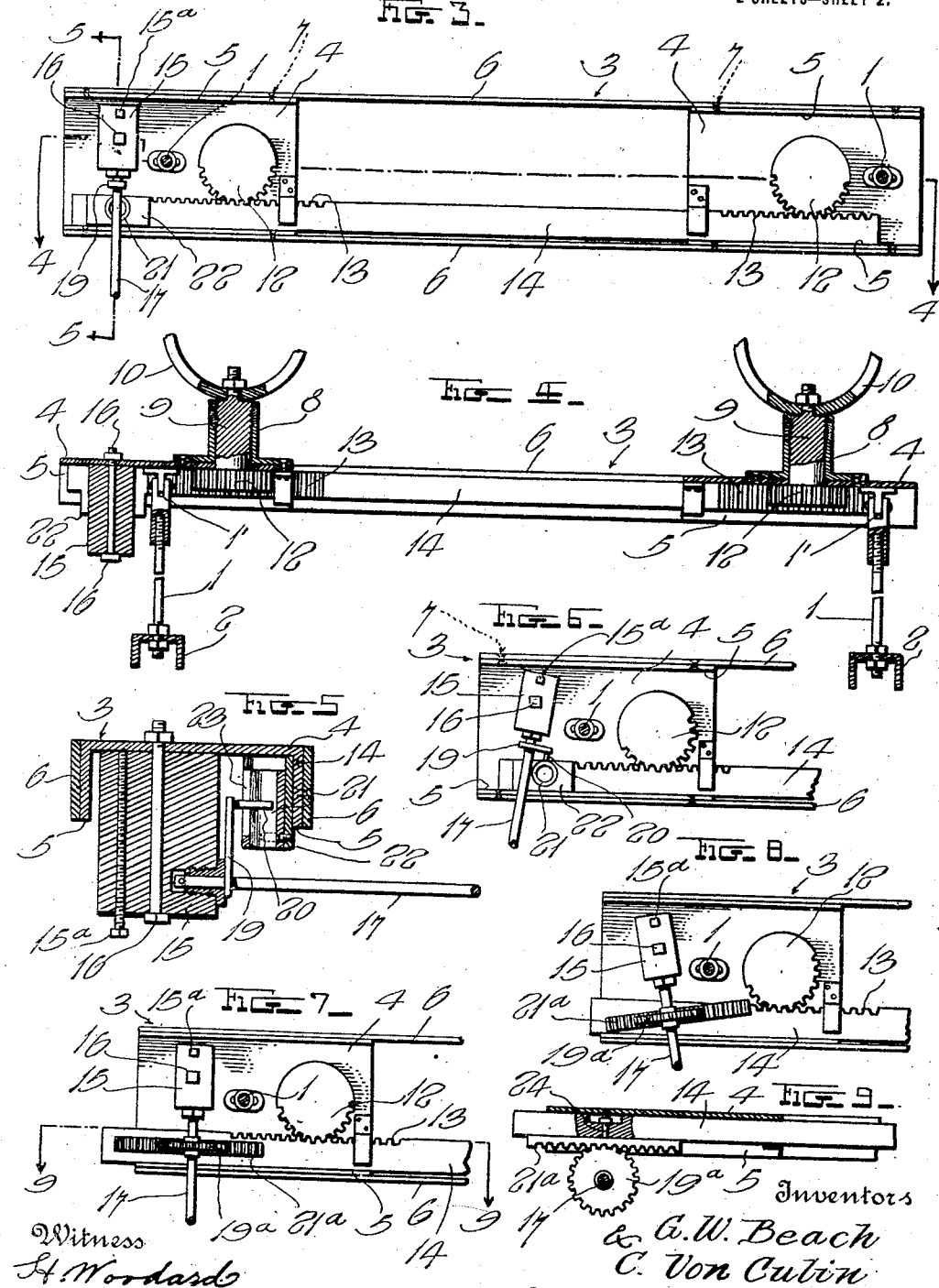

GEORGE WATSON BEACH, OF SAYBROOK, CONNECTICUT, AND CLAYTON VON CULIN, OF NEW YORK, N. Y.

DIRIGIBLE HEADLIGHT.

1,246,526.  Specification of Letters Patent.  Patented Nov. 13, 1917.

Application filed February 19, 1917. Serial No. 149,582.

*To all whom it may concern:*

Be it known that we, GEORGE W. BEACH, a citizen of the United States, residing at Saybrook, in the county of Middlesex, State of Connecticut, and CLAYTON VON CULIN, a citizen of the United States, residing at New York, in the county of New York and State of New York, have invented certain new and useful Improvements in Dirigible Headlights; and we do declare the following to be a full, clear, and exact description of the invention, such as will enable others skilled in the art to which it appertains to make and use the same.

Our invention which relates to improvements in dirigible headlights has for its principal object to provide a support and operating means for the headlight or lights so constructed as to permit application to different types of cars and location of the operating handle at the most convenient point.

With the foregoing general object in view, the invention resides in certain novel features of construction and unique combinations of parts to be hereinafter fully described and claimed, the descriptive matter being supplemented by the accompanying drawings which constitute a part of this application and in which:

Figure 1 is a front elevation of an automobile showing the invention applied;

Fig. 2 is a side elevation with parts broken away and in section;

Fig. 3 is a bottom plan view of the lamp support and the parts mounted thereon;

Fig. 4 is a longitudinal section on the plane of the line 4—4 of Fig. 3;

Fig. 5 is an enlarged vertical transverse section on the plane designated by the line 5—5 of Fig. 3;

Fig. 6 is a bottom plan view of a portion of the lamp support and the parts carried thereby, showing the control shaft adjusted into a different position from that depicted in Fig. 3;

Fig. 7 is a fragmentary bottom plan showing a different manner of operatively connecting the control shaft with the sliding bar which serves to turn the headlights;

Fig. 8 is a duplicate of Fig. 7, with the exception that it illustrates a different adjustment of the control shaft;

Fig. 9 is a sectional view substantially on the plane of the line 9—9 of Fig. 7.

In the drawings above briefly described, the numerals 1 designate a pair of vertical standards which rise rigidly from the side bars 2 of the automobile chassis or from any other suitable parts. Hinged at 1' to the upper ends of the standards 1 are the ends of a lamp support 3, said support including a pair of metal plates 4 stamped or cast so as to provide them with depending side flanges 5. To these flanges, metal bars or rods 6 are secured by rivets or the like 7 so that the two plates 4 are tied together. The bars 6 may be of different lengths so as to space said plates a greater or less amount for adapting the lamp support 3 for use on cars having bodies of different widths.

Bearings 8 are secured to the upper sides of the plates 4 and receive therein vertical stub shafts 9 carrying the brackets 10 of the searchlights 11, the lower ends of said stub shafts being shown as equipped with pinions 12 meshing with rack teeth 13 on a sliding bar 14 which contacts with the inner face of one flange 5 of each plate 4. The pinions 12 and teeth 13 are preferably employed for turning the brackets 10 but it will be understood that any other suitable connections could well be employed for this purpose.

A bearing block 15 is pivoted on a vertical bolt or the like 16 to the under side of one of the plates 4 adjacent the outer end of the latter and the front end of a longitudinally disposed control shaft 17 is rotatably mounted in said block in the manner shown in Fig. 5 or in a similar way. Connections yet to be described are provided between the control shaft 17 and the sliding bar 14 so that the latter may be operated upon turning of said shaft and it will be obvious that vertical tilting of the shaft in question will similarly tilt the entire lamp support 3 to direct the rays of light downwardly or upwardly. The rear end of shaft 17 is located at any preferred point accessible to the driver and a suitable combined lock and handle 18 is provided for adjusting said shaft and holding it in adjusted position. It will be obvious that the pivotal mounting of the block 15 permits the shaft 17 to extend either straight back from the support 3 or to be located obliquely to position the handle 18 at any preferred location.

In the form of the invention illustrated in detail in Figs. 3 to 6, the front end of the control shaft 17 is equipped with an operating member in the form of a laterally extending arm 19 having a crank pin 20, said operating member establishing an operative connection between the shaft 17 and bar 14 by means of a thrust member 21 which is mounted on said bar for turning movement on a vertical axis when the shaft 17 and its bearing block 15 are swung horizontally. The thrust member 21 is in the form of a bushing received in a vertical bore in a block 22 carried on the under side of the bar 14 at one end of the latter, said bushing having a vertical slot 23 receiving the crank pin 20. By this arrangement of parts, rotation of the shaft 17 will serve to shift the bar 14 endwise to steer the headlights 11, regardless of the angular relation of said shaft in respect to the support 3.

In Figs. 7, 8 and 9 the control shaft 17 is provided with an operating member 19ª in the form of a pinion whose teeth mesh with similar teeth on a thrust member 21ª in the form of a rack bar pivoted on a suitable vertical pivot 24 to the sliding bar 14. This arrangement of parts permits angling of the control shaft in respect to the lamp support as indicated in Fig. 8, the thrust member 21ª turning around its pivot 24 during adjustment of said shaft. After shaft 17 has been properly positioned, the bearing block 15 may be locked by a set screw or the like such as indicated at 15ª in the drawings (see more particularly Fig. 5).

Regardless of the specific type of operating connections employed between the control shaft and the bar 14, turning of said shaft will slide the bar in question the required amount to direct the rays from the headlights in any required direction. Furthermore, this operation will in no manner be affected by the angular position of the control shaft in respect to the lamp support 3 and at any time the rays of light may be thrown upwardly or downwardly by tilting the support 3 by means of the shaft.

From the foregoing, taken in connection with the accompanying drawings, it will be obvious that although the invention is of comparatively simple and inexpensive nature, it will be highly efficient and durable and will be adaptable to numerous makes of cars. For these reasons, the constructions shown constitute the preferred forms of the device but it is to be understood that within the scope of the invention as claimed, numerous changes may be made without sacrificing the principal advantages.

We claim:

1. A dirigible headlight comprising a support, a horizontally swinging headlight mounted thereon, a bar adjacent said support and slidable transversely of the vehicle, operating connections between said bar and the headlight for turning the latter when the former is shifted endwise, a control shaft extending transversely of said bar and adapted to have its rear end located for operation by the driver, a bearing rotatably supporting the front end of said control shaft and pivoted to the aforesaid support upon an upright axis, and means operatively connecting said shaft and bar for shifting the latter when the former is rotated.

2. A dirigible headlight comprising a support, a horizontally swinging headlight mounted thereon, a bar adjacent said support and slidable transversely of the vehicle, operating connections between said bar and the headlight for turning the latter when the former is shifted endwise, a control shaft extending transversely of said bar and adapted to have its rear end located for operation by the driver, a bearing rotatably supporting the front end of said control shaft and pivoted to the aforesaid support upon an upright axis, an operating member carried by the front end of said control shaft for shifting said bar when said shaft is rotated, and a thrust member coöperating with said operating member and mounted on said bar for turning on a vertical axis.

3. A dirigible headlight comprising a support, a horizontally swinging headlight mounted thereon, a bar adjacent said support and slidable transversely of the vehicle, operating connections between said bar and the headlight for turning the latter when the former is shifted endwise, a control shaft extending transversely of said bar and adapted to have its rear end located for operation by the driver, a bearing rotatably supporting the front end of said control shaft and pivoted to the aforesaid support upon an upright axis, an arm extending laterally from the front end of said control shaft and having a crank pin, and a cylindrical thrust device mounted rotatably upon the aforesaid sliding bar and having a vertical slot receiving said pin.

4. A dirigible headlight comprising a pair of spaced horizontal plates having depending flanges along their side edges, bars secured at their ends to said flanges for connecting the two plates, a laterally swinging headlight mounted on each of said plates, a sliding bar extending beneath the two plates and contacting slidably with one flange thereof, means for shifting said bar longitudinally, and connections between said bar and said headlights for turning the latter when the former is shifted.

In testimony whereof we have hereunto set our hands in the presence of two subscribing witnesses.

GEORGE WATSON BEACH.
CLAYTON VON CULIN.

Witnesses:
MARK BROWN,
FREDERICK B. BLACKMAN.

Copies of this patent may be obtained for five cents each, by addressing the "Commissioner of Patents, Washington, D. C."